M. DAY.
Corn Sheller.
No. 79,962.
2 Sheets—Sheet 1.
Patented July 14, 1868.
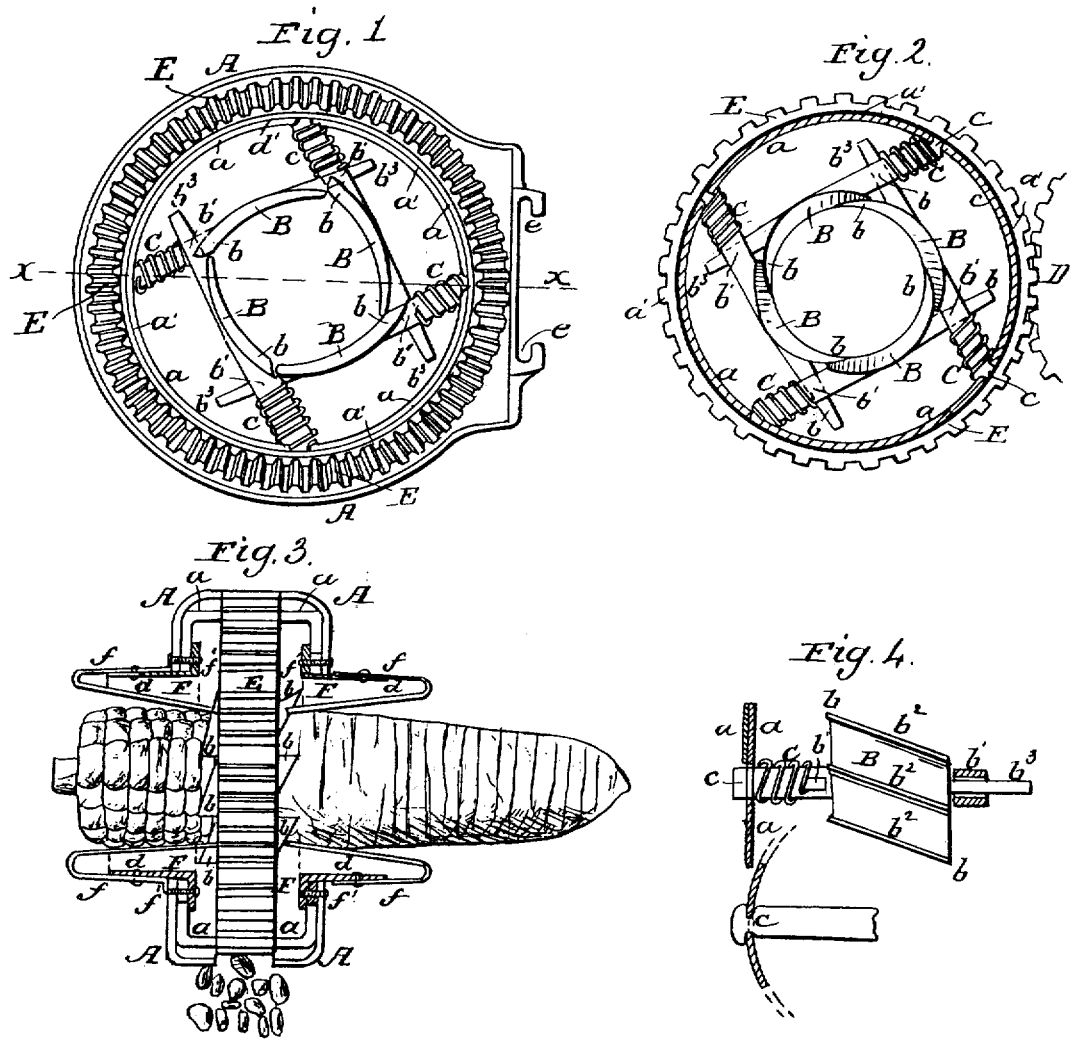
Witnesses:
Edwin James
John D. Blow
Inventor:
Milton Day
per Holman & Hollingshead
Attorneys M. DAY.
Corn Sheller.
No. 79,962.
2 Sheets—Sheet 2.
Patented July 14, 1868.
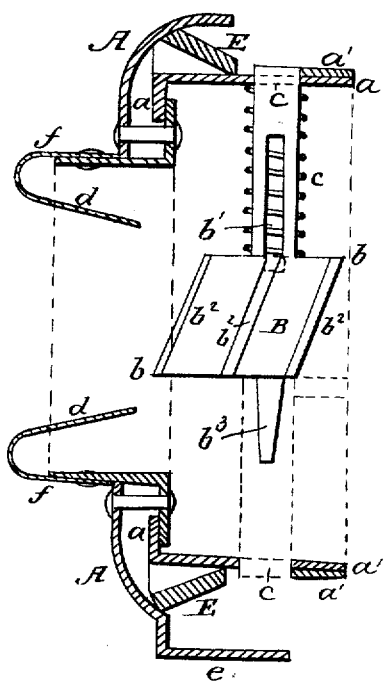
Witnesses:
Edwn James
John D Bloor
Inventor.
Milton Day
per Holmead & Hollingshead
Attorneys.

United States Patent Office.

MILTON DAY, OF BALTIMORE, MARYLAND.

*Letters Patent No. 79,962, dated July 14, 1868.*

---

IMPROVEMENT IN CORN-SHELLERS.

---

The Schedule referred to in these Letters Patent and making part of the same.

---

TO ALL WHOM IT MAY CONCERN:

Be it known that I, MILTON DAY, of Baltimore city, county of Baltimore, and State of Maryland, have invented certain new and useful Improvements in Corn-Shellers; and I do hereby declare that the following is a full, clear, and exact description of the same, reference being had to the accompanying drawing, and to the letters of reference marked thereon, in which—

Figure 1 is a front view of the corn-sheller with half of case removed.

Figure 2 is a rear view of the same without the case.

Figure 3 is an edge view, partly in section, showing the cogs on the rim for a spur-gearing.

Figure 4 is a sketch of one of the palms, showing the threads of a screw on the inside.

Figure 5 is a sectional view through the centre of the machine, with all the palms save one removed and cutting the spiral spring thereof.

The nature of my invention consists in the use, in a corn-sheller, of palms, with three, four, or more fingers or tines, so arranged as to surround the ears of corn, and made so adjustable with springs as to clasp the cob beneath the grains, and yet give to the largest ear, or collapse to suit the size of the smallest, which adjustability is essential to the good working of my invention, and to suit the variable sizes of the ears of corn.

My invention also consists in the use of three or more threads, spirally arranged on the inside surfaces of the palms, which when joined together form screw-threads, and serve to draw in the ears of corn, and thus feed the machine by its own revolutions, and this can be done from either side, the driving-wheel being worked in the proper direction to produce the motion either way, as desired.

This machine may be worked by spur or bevel-gearing, and in the drawings fig. 1 represents the bevel-wheel around the rim, and in fig. 2 the spur-gear is represented, but as I do not claim any particular method, either of bevel or spur, any other means of communicating motion may be applied to the devices herein specified for taking the grain from the cob.

This sheller may be used horizontally, as shown in figs. 1 and 2, or vertically, as shown in fig. 3. If as in figs. 1 and 2, then the ears can be placed into the guide-springs, and the corn and ears will drop through together, but if vertically, the ears must be fed in by the hand, which may be from either side, and the proper motion being given to the driving-wheel, the ears will be drawn in, and the corn will drop through an opening in the case below, and the ears will fall out to one side.

To enable others skilled in the art to make and use my invention, I will proceed to describe its construction and operation.

A is the box or casing, enclosing the rim and palms.

B B are the palms.

C C are the springs.

D is the main driving-wheel.

E E are the cogs on the rim, either spur or bevelled.

$a\ a$ is the rim.

$a^1\ a^1$, the outside ring or band.

$b\ b$, the tines or fingers.

$b^1\ b^1$, the slots in the shanks, through which the points are inserted.

$b^2\ b^2$ are the threads in the palms.

$b^3\ b^3$ are the points of the palms.

$c\ c$ are the necks of the shanks, formed to fit the rim.

$d\ d$ are spring-guides, to feed in the ears of corn.

$e\ e$ are grooves in the casing, by which the machine can be fitted to the corresponding dove-tail piece, having flanges, so that the same may be made fast to any framing-box, or any other suitable place.

F is the circular centre-piece or ring, to the flange of which the case A is fastened by means of the rivets $f'\ f'$.

The construction of this corn-sheller is as follows: A rim, of any metal, and of convenient size, has cogs on its outside, either square across, as in figs. 2 and 3, or bevelled, as in fig. 1. Figs. 3 and 5 are a modification of my device as shown in figs. 1 and 2, in which case the cog-wheel is entirely encased, except at its outer edge, which is left open, in order to receive motion direct from the driving-wheel, in which case the latter works in independent bearings outside of the shelling-mechanism. The double case is an exact counterpart of the single case, as shown in fig. 2, and is also supplied with the spring-guides $d$ $d$. The cogs in the rim mesh with the teeth of the driving-gear wheel, which may be of any construction, and can be worked by hand, as with a common crank and handle, or by a pulley and band, or any other convenient way, and if by hand, the stand or bracket can be made to be screwed to the side of a corn-bin, barn-door, or any other place, and the ears of the case are made dove-tailed, to fit the said bracket, and can be at once removed.

In this rim are three, four, or more slots, made at such points according to the number of palms to be used, which slots are to receive the necks of the palm-shanks, which necks are represented in fig. 4. Over the outside of the rim is a band, which closes down near the shank-heads, to keep them from rising, yet not too close to bind them. This band is to be riveted to the rim to prevent it from falling off.

These shanks are, with the palms, of one piece of metal, either cast or wrought, of any suitable metal, and the shanks have in them a slot, to receive the projecting point of the adjacent palm, which passes through, and the shank of this point has at its other end a similar slot, for the point of another shank, and so on until all, whether three, four, or more, are connected by their points in the middle, and held by their necks in the rim. They form a frame, which is sufficiently rigid to clasp the ears of corn and sustain them.

These shanks have in the middle a wide part, spread out like the palm of a hand, and above and below formed into points, tines, or fingers, consisting of three, four, or more, and the inside surface of the palms so curved that when placed together in their proper connection, according to their number, will form nearly a circle when taking in an average-sized ear of corn. On the shank of each palm is a spiral spring, bearing against the adjacent palm and the outer rim, and these springs keep the set of palms close together, yielding, however, to the ears as they pass through, but closing the points tightly under the grains, and causing them to be stripped off as the cob is drawn in.

Having thus fully described my invention, I disclaim the use generally of palms or tines, as they have been used before; but

What I claim as new therein, and desire to secure by Letters Patent of the United States, is—

A corn-sheller, having a series of palms, B B, each having feeding-threads, $f^2 f^2$, on their inside, when the same are so arranged that they afford projecting tines, $b$ $b$, to receive the cob, and are in combination with the fingers and springs C, and the whole are made to operate substantially as described.

In testimony whereof, I have signed my name to this specification in the presence of two subscribing witnesses.

MILTON DAY.

Witnesses:
 EDWIN JAMES,
 JOHN D. BLOOR.